(12) United States Patent
Schöfberger

(10) Patent No.: US 6,319,289 B1
(45) Date of Patent: Nov. 20, 2001

(54) ORGANIC COMPOUNDS

(75) Inventor: Georg Schöfberger, Basel (CH)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 09/283,079

(22) Filed: Mar. 31, 1999

(30) Foreign Application Priority Data

Apr. 3, 1998 (CH) .................................................. 0805/98

(51) Int. Cl.[7] .............................. D06P 1/38; C09D 11/00; C07D 498/04

(52) U.S. Cl. ..................... 8/543; 8/436; 8/544; 8/917; 8/918; 8/924; 544/76; 544/75; 544/77; 106/31.47

(58) Field of Search .................. 544/76, 75, 77; 8/543, 436, 544, 917, 918, 924; 106/31.47

(56) References Cited

U.S. PATENT DOCUMENTS 5,880,282  3/1999  Harms et al. ........................ 544/76

FOREIGN PATENT DOCUMENTS

| 0385120 | 9/1990 | (EP) . |
| 0472975 | 3/1992 | (EP) . |
| 0541084 | 5/1993 | (EP) . |
| 588257 * | 3/1994 | (EP) . |
| 0681005 | 11/1995 | (EP) . |
| 6-73670 | 3/1994 | (JP) . |
| 107961 | 4/1994 | (JP) . |
| 6-299474 | 10/1994 | (JP) . |

OTHER PUBLICATIONS

PCT Search Report.
Derwent Abstract, AN 94–124454 '15—XP 002104079 "Asymmetric Dioxazime".
Derwent Agstract, AN 94–164161 '20—XP 002104081 "Nonsymmetrical dioxazine compound".
Derwent Abstract, AN 95–012368 '02 "Dyeing or printing cellulosic fiber".
Berichte 28 (1895), 1315–1318.
Ullmanns Encyklopädie der technischen Chemie, 4th edition, 1982, vol. 22, pp. 658–673.
Grundlagen Der Textilveredlung, M. Peter and H.K. Rouette, 13th edition 1989, pp. 535–556 abd 556–574.

* cited by examiner

*Primary Examiner*—Mukund J. Shah
*Assistant Examiner*—Sudhaker B Patel
(74) *Attorney, Agent, or Firm*—Scott E. Hanf

(57) ABSTRACT

Compounds of formula (I)

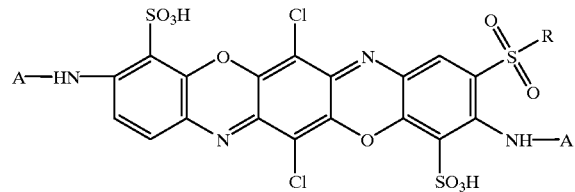

wherein A is hydrogen or a descretionary radical, a novel process for their preparation and their use for the dyeing of organic substrates.

11 Claims, No Drawings

ORGANIC COMPOUNDS

The invention relates to novel triphendioxazine dyes, a novel process for their preparation and to their use for the dyeing of organic substrates.

Triphendioxazine dyes are known both as anionic and as cationic dyes for the dyeing of a wide range of substrates. They are also used as reactive dyes and as pigments.

It has now been found that a novel process makes it possible to prepare unilaterally substituted triphendioxazine dyes which contain a discretionarily substituted sulfone group and may serve both as acid dyes and as reactive dyes.

The invention accordingly provides compounds of formula (I)

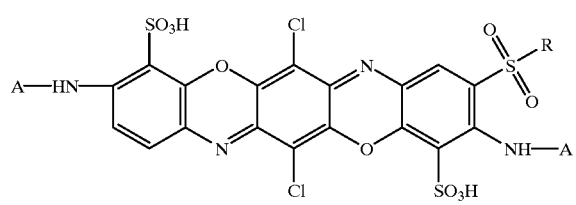

(I)

wherein A is hydrogen or a discretionary substituent and R is a discretionary radical, the manner of the substitution of this radical or the substituents A being determining for the nature of the end products. Neutral or anionic substituents provide acidic dyes for the dyeing of wool, silk and synthetic polyamides; and also for leather, paper and for preparing inks for the inkjet process, and the presence of reactive groups provides reactive dyes for the dyeing of cellulose. These are merely exemplary suggestions, which may be added to at one's discretion, because the novel inventive process makes it possible to introduce discretionary radicals R and the substituents A can likewise be discretionary in nature.

A is preferably hydrogen or a discretionarily substituted alkyl or aryl radical, these substituents preferably being identical. However, it is also possible to introduce a discretionarily substituted triazine group in a targeted manner on one side of the molecule only.

However, preferred dyes for the dyeing of wool, silk and synthetic polyamides contain only single, unsubstituted $C_{1-12}$alkyl or phenyl radicals as substituent A or, most preferably, are unsubstituted, i.e. contain two primary amino groups.

If, on the other hand, reactive dyes are desired, the reactive group(s) required for this purpose is(are) preferably introduced as correspondingly substituted radical A, it being possible for the molecule to be provided either symmetrically with two identical radicals A or unilaterally with one radical A. Examples of such radicals are known from a wide range of dye classes and may be used discretionarily provided it is possible to introduce them by substitution of a primary amino group.

The novel triphendioxazine dyes contain at a given location a discretionarily substituted sulfone group which is introduced using a novel process. This process according to the invention is characterized in that a triphendioxazine of the formula (II)

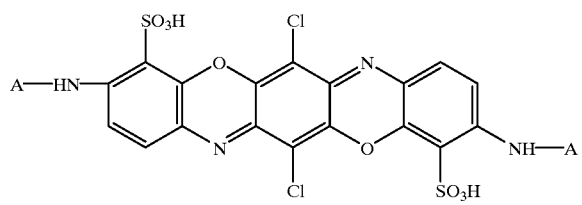

(II)

is reacted with a discretionarily substituted sulfinic acid or its salt in the presence of an oxidizing agent. This reaction is already known and is described, for example for dyes, in Berichte 28 (1895), 1315–1318.

However, this reaction has hitherto never been used for the unilateral substitution of the triphendioxazine molecule and it is surprising that this asymmetric substitution using discretionarily substituted sulfinic acids succeeds in quantitative yield.

The radical R may therefore be a discretionarily substituted alkyl, cycloalkyl or aryl radical and it is also possible to use heterocyclic sulfinic acids. Preference is given to the available aliphatic and particularly aromatic sulfinic acids as described in a wide range of general articles. Examples of preferred radicals R are $C_{1-12}$alkyl, phenyl, naphthyl and, in particular, substituted phenyl or naphthyl, these substituents possibly being $C_{1-12}$alkyl, halogen, $C_{1-12}$alkoxy and, in particular, substituted amino or sulfonic acid groups. Particularly preferred radicals R are phenyl and naphthyl groups carrying an amide radical, which is for its part discretionarily substituted and may be either an amino group reacted with sulfonic acid or carboxylic acid or an amidated sulfonic acid or carboxyl group. These radicals R may for their part also carry dye radicals such as anthraquinone radicals or triphendioxazine radicals.

Particularly preferred dyes of the formula (I) have the structure

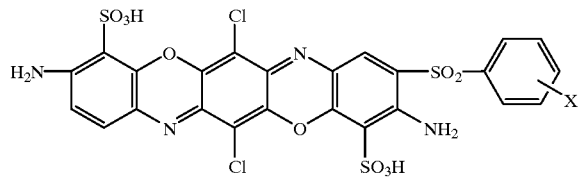

wherein X is a radical —NH—CO—Y, —SO$_2$—NH—Y, —CO—NH—Y or —NH—SO$_2$—Y and Y is a discretionary radical.

This radical Y is preferably a discretionarily substituted $C_{1-12}$alkyl, phenyl or naphthyl group or, in the case of —SO$_2$—NH—Y or —CO—NH—Y, hydrogen.

The process for the preparation of the compounds of the formula (I) according to the invention may be carried out under the known conditions as have been described for reacting phenylenediamine with sulfinic acids. Depending on the choice of the oxidizing agent, the pH maintained is alkaline or acidic and the reaction takes place at higher or lower temperatures. Examples of suitable oxidizing agents are: iron(III) salts, peroxodisulfates (persulfates), permanganates, manganese dioxide, chromic acid, peroxides, peracids, dichromate, chlorates, bromates, iodates, silver oxide, lead oxide, lead tetraacetate, with peroxodisulfates and iron(III) salts being preferred.

The starting compounds of the formula (II) and the sulfinic acids used are known compounds or can be prepared from known compounds analogously to known preparative processes.

The dyes of the formula (I) can be isolated from the reaction medium by known processes, for example by salting out with an alkali metal salt, filtration and drying, optionally in vacuo at slightly elevated temperature.

Depending on the reaction and/or isolation conditions, the dyes of the formula (I) can be obtained as free acid, as salt or as mixed salt which contains for example one or more cations selected from alkali metal ions, for example the sodium ion, or an ammonium ion or alkylammonium cation, for example mono-, di- or trimethyl- or -ethyl-ammonium cations. The dye can be converted by conventional techniques from the free acid into a salt or into a mixed salt or vice versa or from one salt form into another.

The dyes of the formula (I) and their salts are particularly suitable for dyeing or printing fibrous material consisting of natural or synthetic polyamides in blue shades.

The invention therefore provides from another aspect for the use of the dyes of the formula (I), their salts and mixtures for the dyeing or printing of fibrous materials which consist of natural or synthetic polyamides.

The dyeing is carried out according to known processes, for example the dyeing processes described in Ullmanns Encyklopädie der technischen Chemie, 4th edition, 1982, Volume 22, pages 658–673 or in the book by M. Peter and H. K. Rouette, Grundlagen der Textilveredlung, 13th edition, 1989, pages 535–556 and 566–574. Dyeing preferably takes place in the exhaust process at a temperature of 30 to 100° C., particularly preferably 80 to 100° C., and a liquor ratio of 40:1.

The substrate to be dyed can be present for example in the form of yarn, woven fabric, knitted fabric or carpet. Fully-fashioned dyeings are also very satisfactorily possible on delicate substrates, for example lamb's wool, cashmere, alpaca and mohair.

The dyes according to the present invention and their salt possess good compatibility with known acid dyes. Accordingly, the dyes of the formula (I), their salts or mixtures can be used alone in a dyeing or printing process or else as component in a combination dyeing or printing composition together with other acid dyes of the same class, i.e., with acid dyes which possess comparable dyeing properties, for example fastness properties and exhaustion rates from the dyebath to the substrate. The dyes of the present invention can in particular be used together with certain other dyes having suitable chromophores. The ratio in which the dyes are present in a combination dyeing or printing composition is dictated by the hue to be obtained.

The novel dyes of the formula (I), as stated above, are highly suitable for the dyeing of natural and synthetic polyamides, i.e., of wool, silk and all nylon types, on which dyeings having high fastness level, especially good lightfastness and good wetfastnesses (wash 50° C., alkaline perspiration) are obtained. The dyes of the formula (I) and their salts provide high exhaustion and fixing rates. In addition, unfixed dye is easy to wash off the substrate. The build-up capacity of the dyes of the formula (I) and their salt is likewise good. Tone-on-tone dyeings on the substrates mentioned exhibit excellent quality. All dyeings also exhibit a constant hue under artificial light. Furthermore, the fastness to decating and boiling is good.

One decisive advantage of the novel dyes is that they are metal-free.

When these dyes contain reactive groups, they are suitable for the dyeing or printing of hydroxyl-containing or nitrogenous organic substrates. Preferred substrates are leather and fiber materials consisting of or comprising natural or synthetic polyamides and especially natural or regenerated cellulose, such as cotton, filament viscose or staple viscose. The most preferred substrate is textile material consisting of or comprising cotton.

The compounds of the formula (I) can be used in dyeing liquors or in print pastes according to all dyeing or printing processes customary for reactive dyes. Dyeing is preferably carried out by the exhaust process from an aqueous medium and within the temperature range of 30–100° C., especially at 50–60° C. or 80–100° C. Preference is given to employing a liquor ratio (liquor to substrate) of 6:1 to 30:1, more preferably of 10:1 to 20:1.

The compounds according to the invention can be used as individual dyes or else, owing to their good compatibility, as combination element with other reactive dyes of the same class which possess comparable dyeing properties, for example with regard to general fastnesses, exhaustion value, etc. The combination dyeings obtained have similar fastnesses to the dyeings with individual dyes.

The compounds of the formula (I) provide good exhaustion and fixation values. The unfixed dye portion is easy to wash off. The dyeings and prints obtained possess good lightfastness. They additionally possess good wetfastness properties, for example in respect of wash, water, seawater and perspiration fastness, and have good stability to oxidative influences such as chlorinated water, hypochlorite bleach, peroxide bleach and also perborate laundry detergents. In the Examples which follow, parts and percentages are by weight; temperatures are given in degrees Celsius.

EXAMPLE 1

54.5 parts of 3,10-diamino-6,13-dichlorotriphendioxazine-4,11-disulfonic acid are dissolved in 1000 parts of water with lithium hydroxide at pH 8.5 and admixed with 29 parts of 4-acetylaminobenzenesulfinic acid in the form of its sodium salt and then with 36 parts of potassium peroxodisulfate. All the while, the pH is maintained between 7 and 8 by addition of aqueous sodium hydroxide solution. The reaction product formed is filtered off and dried. Drying leaves the compound of the formula

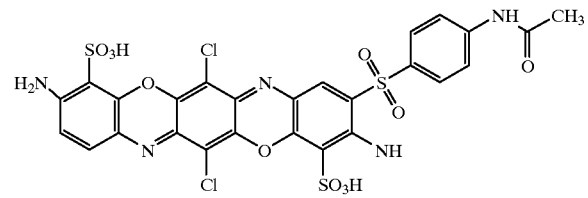

It dyes synthetic polyamides and wool in brilliant reddish blues having excellent wetfastnesses.

EXAMPLE 2

54.5 parts of 3,10-diamino-6,13-dichlorotriphendioxazine-4,11-disulfonic acid are dissolved in 1000 parts of water with lithium hydroxide at pH 8.5 and admixed with 20 parts of 3-aminobenzenesulfinic acid. 31 parts of ammonium peroxodisulfate are then sprinkled in over 1 hour. The pH drops to 2.5–3. After filtering, the residue is stirred at 60° into 1000 parts of water and dissolved by neutralization with lithium hydroxide. At 60–65° 30 parts of 4-methylbenzenesulfonyl chloride are sprinkled in over 2 hours and the pH is maintained at 5.5–6 by addition of lithium hydroxide. The reaction product formed is filtered off and dried. Drying leaves the compound of the formula.

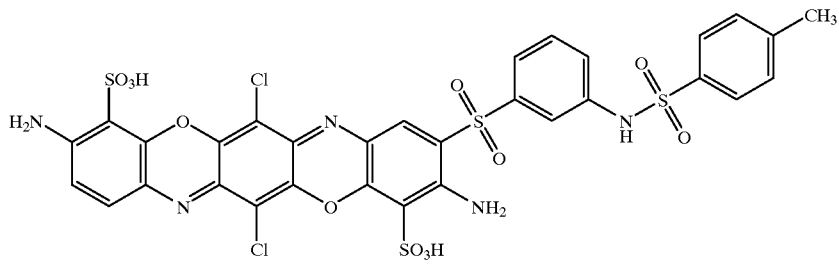

It dyes synthetic polyamides and wool in brilliant reddish blues having excellent wetfastnesses.

EXAMPLE 3

54.5 parts of 3,10-diamino-6,13-dichlorotriphendioxazine-4,11-disulfonic acid are dissolved in 1000 parts of water and 400 parts of dimethylformamide with lithium hydroxide at pH 8.5 and admixed with 16 parts of methylsulfinic acid in the form of its sodium salt and then with 42 parts of iron(II) chloride, dissolved in 200 parts of water. The pH drops to 2.5–3. The reaction mixture is admixed with 46 parts of conc. hydrochloric acid and then filtered off. The filtration residue is again dissolved in 1000 parts of water and lithium hydroxide at pH 8–9. The dye is reprecipitated with 80 parts of sodium chloride, filtered and dried. The dye conforms to the structure

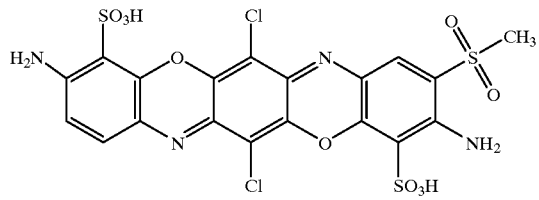

and dyes synthetic polyamides and wool in brilliant reddish blues having good wetfastnesses.

EXAMPLE 4

69.7 parts of C.I. Direct Blue 106, prepared according to U.S. Pat. No. 2,134,505, are dissolved in 1000 parts of water, admixed with 25 parts of benzenesulfinic acid and added to a solution of 36 parts of sodium peroxodisulfate in 500 parts of water. The pH drops to 1.5–2. Once starting material is no longer detectable in the thin layer chromatogram, the pH is adjusted to 7–8 with sodium carbonate and the dye is precipitated by addition of 150 parts of sodium chloride. It dyes wool and polyamides in a brilliant reddish blue shade having very good wash, perspiration and milling fastnesses. It is possible to attribute the following general structure to it:

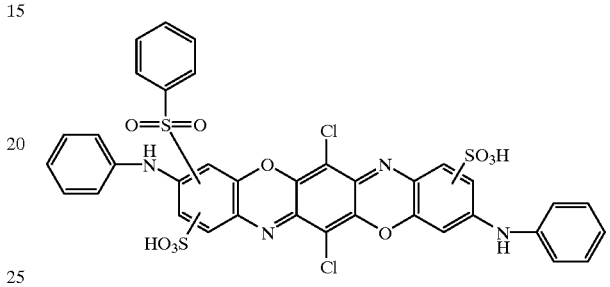

EXAMPLE 5

54.5 parts of 3,10-diamino-6,13-dichlorotriphendioxazine-4,11-disulfonic acid are dissolved in 1000 parts of water with lithium hydroxide at pH 8.5. The solution is admixed with 0.2 part of a wetting agent based on an ethoxylated alkylphenol, 25 parts of sodium benzenesulfinate and then, over one hour, with 36 parts of benzoyl peroxide. The pH drops toward 5. After three hours of stirring, the reaction product can be filtered off. It conforms to the structure

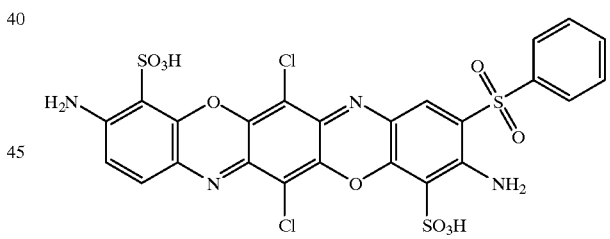

and dyes synthetic polyamides and wool in brilliant reddish blues having good wetfastresses.

EXAMPLE 6

54.5 parts of 3,10-diamino-6,13-dichlorotriphendioxazine-4,11-disulfonic acid are dissolved in 1000 parts of water with lithium hydroxide at pH 8.5 and admixed with 25 parts of the sodium salt of benzenesulfinic acid, dissolved in 200 parts of water. This solution is added dropwise to a solution of 40 parts of sodium bichromate in 400 parts of water. All the while, the pH is maintained between 5 and 5.5 by addition of hydrochloric acid. The same dye is obtained as in Example 5.

Proceeding analogously to the methods described in Examples 1–6 makes it possible to prepare the following Examples:

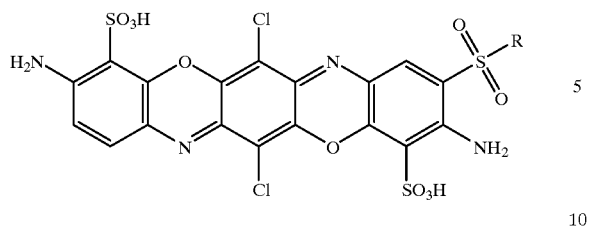
| Example | R |
|---|---|
| 7 | −C₆H₅ (phenyl) |
| 8 | 2-methylphenyl |
| 9 | 3,4-dimethylphenyl |
| 10 | 3,5-dimethylphenyl (2,4-dimethyl) |
| 11 | 4-ethylphenyl |
| 12 | 4-isopropylphenyl |
| 13 | 4-tert-butylphenyl |
| 14 | 4-C₈H₁₇-phenyl |
| 15 | 4-C₁₂H₂₅-phenyl |

| Example | R |
|---|---|
| 16 | 3-methylnaphthyl group |
| 17 | 8-methylnaphthyl group |
| 18 | 4-chloro-methylphenyl group |
| 19 | 2-chloro-methylphenyl group |
| 20 | 4-(propanoylamino)methylphenyl — Ar–NHCOC$_2$H$_5$ |
| 21 | 4-(ethoxycarbonylamino)methylphenyl — Ar–NHC(O)O–C$_2$H$_5$ |
| 22 | 4-(dodecyloxycarbonylamino)methylphenyl — Ar–NHC(O)O–C$_{12}$H$_{25}$ |
| 23 | 4-(2-ethylhexyloxycarbonylamino)methylphenyl |
| 24 | 4-(decyloxycarbonylamino)methylphenyl — Ar–NHC(O)O–C$_{10}$H$_{21}$ |
| 25 | 6-methyl-2(3H)-benzoxazolone group |
| 26 | 4-(benzoylamino)methylphenyl group |

-continued

| Example | R |
|---------|---|
| 27 | 4-methylphenyl-NH-C(=O)-(4-chlorophenyl) |
| 28 | 3-methylphenyl-NH-C(=O)-CH₃ |
| 29 | 3-methylphenyl-NH-C(=O)-C$_6$H$_{13}$ |
| 30 | 3-methylphenyl-NH-C(=O)-O-C$_2$H$_5$ |
| 31 | 3-methylphenyl-NH-C(=O)-O-C$_{12}$H$_{25}$ |
| 32 | 3-methylphenyl-NH-S(=O)$_2$-(4-isopropylphenyl) |
| 33 | 3-methylphenyl-NH-C(=O)-O-phenyl |
| 34 | 3-methylphenyl-NH-S(=O)$_2$-(2-naphthyl) |

-continued

| Example | R |
|---|---|
| 35 | (3-methylphenyl)-NH-SO2-C6H4-SO2-C6H5 |
| 36 | (3-methylphenyl)-NH-SO2-C6H4-SO2-NH-C6H5 |
| 37 | (3-methylphenyl)-NH-SO2-C6H4-SO2-N(Et)-C6H5 |
| 38 | (3-methylphenyl)-NH-SO2-C6H4-SO2-NH-CH2-CH(Et)-C4H9 |
| 39 | (3-methylphenyl)-NH-SO2-C6H4-O-SO2-C6H4-CH3 |
| 40 | (3-methylphenyl)-NH-SO2-C6H4-SO2-C6H4-N(CH3)(C7H15) |
| 41 | (3-methylphenyl)-NH-SO2-C6H4-O-C6H4-NH-C(O)-CH3 |
| 42 | (3-methylphenyl)-NH-SO2-C6H4-O-C6H4-NH-C(O)-CH2-Cl |

-continued

| Example | R |
|---|---|
| 43 | (3-methylphenyl)NH-SO₂-(phenyl)-SO₂-N(CH₃)(phenyl) |
| 44 | (3-methylphenyl)NH-SO₂-(phenyl)-CH₂-N(ethyl)(phenyl) |
| 45 | (6-methylnaphth-2-yl)NH-SO₂-phenyl |
| 46 | (6-methylnaphth-2-yl)NH-SO₂-(4-methylphenyl) |
| 47 | (6-methylnaphth-2-yl)NH-C(=O)-O-C₁₂H₂₅ |
| 48 | (6-methylnaphth-2-yl)NH-SO₂-(4-tert-butylphenyl) |
| 49 | (6-methylnaphth-2-yl)NH-SO₂-(4-chlorophenyl) |
| 50 | (6-methylnaphth-2-yl)NH-SO₂-(4-(NH-SO₂-CH₃)phenyl) |

-continued

| Example | R |
|---|---|
| 51 | 6-methylnaphthalen-2-yl-NH-SO₂-(4-acetamidophenyl) |
| 52 | 6-methylnaphthalen-2-yl-NH-SO₂-(naphthalen-2-yl) |
| 53 | 6-methylnaphthalen-2-yl-NH-SO₂-(6-acetamidonaphthalen-2-yl) |
| 54 | 6-methylnaphthalen-2-yl-NH-SO₂-(4-biphenyl) |
| 55 | 7-methylnaphthalen-2-yl-NH-SO₂-(4-methylphenyl) |
| 56 | 8-methylnaphthalen-2-yl-NH-SO₂-(4-methylphenyl) |
| 57 | 5-methylnaphthalen-2-yl-NH-SO₂-(4-methylphenyl) |
| 58 | 6-methylnaphthalen-1-yl-NH-SO₂-(4-methylphenyl) |

-continued
| Example | R |
|---|---|
| 59 | 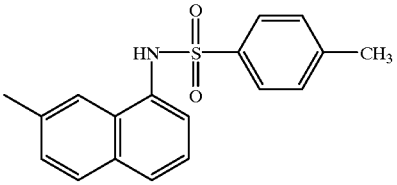 |
| 60 | 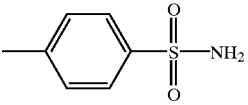 |
| 61 | 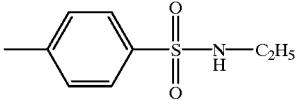 |
| 62 | 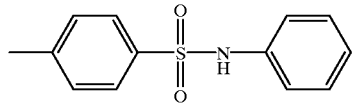 |
| 63 | 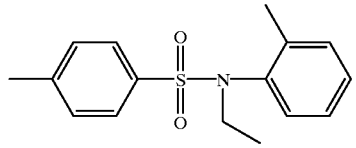 |
| 64 | 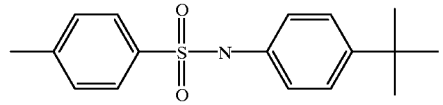 |
| 65 | 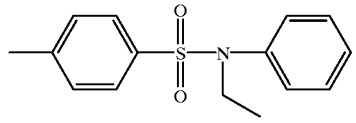 |
| 66 | 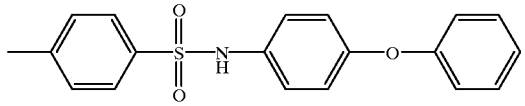 |
| 67 | 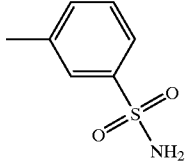 |
| 68 | 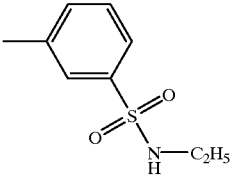 |

-continued

| Example | R |
|---|---|
| 69 | 3-methylphenyl-SO₂-NH-C(CH₃)₃ (N-tert-butyl 3-methylbenzenesulfonamide) |
| 70 | 3-methylphenyl-SO₂-NH-CH₂-CH(C₂H₅)-CH₂CH₂CH₂CH₃ (N-(2-ethylhexyl) 3-methylbenzenesulfonamide) |
| 71 | 3-methylphenyl-SO₂-N(CH₃)-CH₂CH₂-OH |
| 72 | 1-amino-4-(3-methylphenylamino)anthraquinone |
| 73 | 1-amino-4-(3-methylphenylamino)-2-sulfo-anthraquinone (HO₃S at 2-position) |
| 74 | 4-methylphenyl-N=N-phenyl |
| 75 | 4-methylphenyl-O-(4-acetamidophenyl) (CH₃-C₆H₄-O-C₆H₄-NH-C(=O)-CH₃) |

-continued

| Example | R |
|---|---|
| 76 |  |
| 77 | 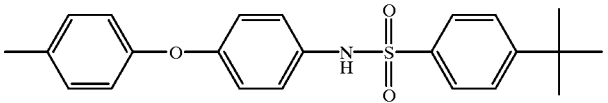 |
| 78 | 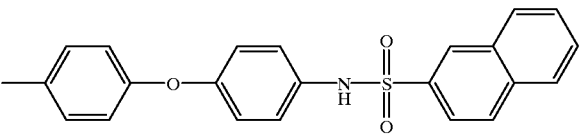 |

EXAMPLE 79

136 parts of the dye in Example 9 of German Offenlegungsschrift 2503611 are dissolved in 2000 parts of water with lithium hydroxide at pH 8.5 and admixed with 22 parts of 4-methylbenzenesulfinic acid in the form of its sodium salt and then with 32 parts of potassium peroxodisulfate. All the while, the pH is maintained between 7 and 8 by addition of aqueous sodium hydroxide solution. The reaction product formed is filtered off and dried. Drying leaves the compound of the formula

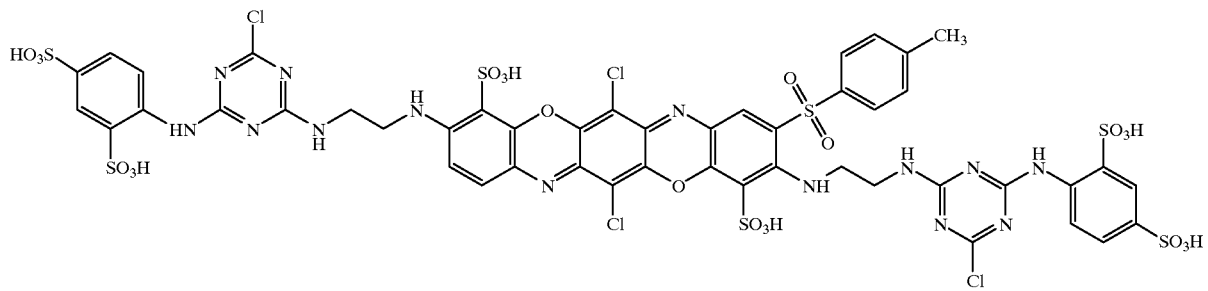

It dyes cellulose textile materials according to the known methods for the dyeing of reactive dyes with a reddish blue shade and good fastnesses.

EXAMPLE 80

54.5 parts of 3,10-diamino-6,13-dichlorotriphendioxazine-4,11-disulfonic acid are dissolved in 1000 parts of water with parts of lithium hydroxide at pH 8.5 and admixed with 500 parts of ice. 18.4 parts of cyanuric chloride are then sprinkled in and the batch is stirred at 0–5° until starting material is no longer detectable in the thin layer chromatogram. All the while, the pH is maintained between 6 and 7 by dropwise addition of lithium hydroxide solution. 22 parts of diethylene glycol amine are then added, and the batch is gradually heated to 80° and the pH is maintained between 8 and 9 by dropwise addition of a lithium hydroxide solution. The reaction product formed is filtered off and redissolved in 1000 ml of water. This solution is admixed with 26 parts of naphthalene-2-sulfinic acid in the form of its sodium salt, and then 35 parts of potassium peroxodisulfate are sprinkled in. The dye formed is filtered off and dried. It conforms to the structure.

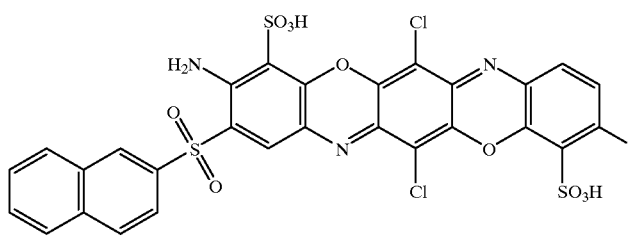
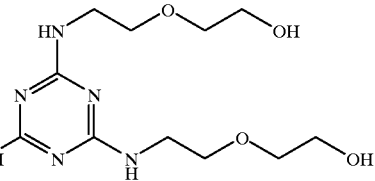

and dyes wool and synthetic polyamides with a violet shade and very good wetfastnesses.

APPLICATION EXAMPLE A

A dyebath at 40° C., consisting of 2000 parts of water, 1 part of a weakly cation-active leveling agent which is based on an ethoxylated aminopropyl fatty acid amide and which has affinity for dye, 1.5 parts of the dye of Example 1 and adjusted to pH 5 with 1–2 parts of 40% acetic acid is entered with 100 parts of nylon-6 fabric. After 10 minutes at 40° C., the dyebath is heated to 98° C. at a rate of 1° C. per minute and then left at the boil for 45–60 minutes. Thereafter it is cooled down to 70° C. over 15 minutes. The dyeing is removed from the bath, rinsed with hot and then with cold water and dried. The result obtained is a blue polyamide dyeing possessing good light- and wetfastnesses.

APPLICATION EXAMPLE B

A dyebath at 40° C., consisting of 2000 parts of water, 1 part of a weakly cation-active leveling agent which is based on an ethoxylated aminopropyl fatty acid amide and which has affinity for dye, 1.5 parts of the dye of Example 1 and adjusted to pH 5.5 with 1–2 parts of 40% acetic acid is entered with 100 parts of nylon-6,6 fabric. After 10 minutes at 40° C., the dyebath is heated to 120° C. at a rate of 1.5° C. per minute and then left at this temperature for 15–25 minutes. Thereafter it is cooled down to 70° C. over 25 minutes. The dyeing is removed from the dyebath, rinsed with hot and then with cold water and dried. The result obtained is a blue polyamide dyeing with good levelness and having good light- and wetfastnesses.

APPLICATION EXAMPLE C

A dyebath at 40° C., consisting of 4000 parts of water, 1 part of a weakly amnphoteric leveling agent which is based on a sulfated, ethoxylated fatty acid amide and which has afinity for dye, 2 parts of the dye of Example 1 and adjusted to pH 5 with 1–2 parts of 40% acetic acid is entered with 100 parts of wool fabric. After 10 minutes at 40° C., the dyebath is heated to boiling at a rate of 1° C. per minute and then left at the boil for 45–60 minutes. Thereafter it is cooled down to 70° C. over 20 minutes. The dyeing is removed from the bath, rinsed with hot and then with cold water and dried. The result obtained is a blue wool dyeing possessing good light- and wetfastnesses.

APPLICATION EXAMPLE D 100 parts of a woven nylon-6 material are padded with a
  50° C. liquor consisting of 40 parts of the dye of
  Example 1,
100 parts of urea,
20 parts of a nonionic solubilizer based on butyldiglycol,
15–20 parts of acetic acid (to adjust the pH to 4),
10 parts of a weakly cation-active leveling agent which is
  based on an ethoxylated aminopropyl fatty acid amide
  and has affinity for dye, and 810–815 parts of water (to make up to 1000 parts of
  padding liquor).

The material thus impregnated is rolled up and left to dwell in a steaming chamber under saturated steam conditions at 85–98° C. for 3–6 hours for fixation. The dyeing is then rinsed with hot and cold water and dried. The result obtained is a blue nylon dyeing having good levelness in the piece and good light-and wetfastnesses.

APPLICATION EXAMPLE E

A textile cut pile sheet material composed of nylon-6 and having a synthetic base fabric is padded with a liquor containing per 1000 parts.

2 parts of dye of Example 1
4 parts of a cornmercially available thickener based on
  carob flour ether
2 parts of a nonionic ethylene oxide adduct of a higher
  alkylphenol
1 part of 60% acetic acid.

This is followed by printing with a paste which per 1000 parts contains the following components:

20 parts of commercially available alkoxylated fatty alky-
  lamine (displace product)
20 parts of a commercially available thickener based on
  carob flour ether.

The print is fixed for 6 minutes in saturated steam at 100° C., rinsed and dried. The result obtain is a level-colored cover material having a blue and white pattern.

APPLICATION EXAMPLE F

A dyebath at 40° C. consisting of 2000 parts of water, 1 part of a weakly cation-active leveling agent which is based on an ethoxylated aminopropyl fatty acid amide and has affinity for dye, 0.5 part of the dye of Example 1, 0.6 part of a commercially available preparation of C.I. Acid Yellow 236 (Nylosan Yellow F-L) and 0.25 part of a commercially available preparation of C.I. Acid Red 154 (Nylosan Red F-2B) and adjusted to pH 5 with 1–2 parts of 40% acetic acid is entered with 100 parts of nylon-6,6 fabric. After 10 minutes at 40° C., the dyebath is heated to 98° C. at a rate of 1° C. per minute and then left at the boil for 45–60 minutes. This is followed by cooling down to 70° C. over 15 minutes. The dyeing is removed from the bath, rinsed with hot and then with cold water and dried. The result obtained is a level gray polyamide dyeing having good light- and wetfastnesses.

APPLICATION EXAMPLE G

A dyebath consisting of 1000 parts of water, 80 parts of calcined Glauber salt, 1 part of sodium nitrobenzene-3-sulfonate and 1 part of dye of Example 79 is heated to 80° C. over 10 minutes. It is then entered with 100 parts of mercerized cotton. This is followed by dyeing at 80° C. for 5 minutes and then heating to 95° C. over 15 minutes. After 10 minutes at 95° C., 3 parts of sodium carbonate are added, followed 20 minutes later by a further 7 parts of sodium carbonate and after 30 minutes at 95° C. another 10 parts of sodium carbonate. The dyeing is then continued at 95° C. for 60 minutes. The dyed material is then removed from the dyebath and rinsed for 3 minutes in running demineralized water. It is then washed twice for 10 minutes in 5000 parts of boiling demineralized water each time, then rinsed for 3 minutes in running demineralized water at 60° C. and for one minute with cold tapwater. Drying leaves a brilliant blue cotton dyeing having good fastnesses.

APPLICATION EXAMPLE H 100 parts of a chrome-tanned and synthetically retanned shave-moist grain leather are dyed for 30 minutes in a bath of 300 parts of water and 2 parts of the dye of Example 1 at 55° C. After addition of 4 parts of a 60% emulsion of a sulfited fish oil, the leather is fatliquored for 45 minutes. It is then acidified with 8.5% formic acid and milled for 10 minutes (final pH in the bath 3.5–4.0). The leather is then rinsed, allowed to drip dry and finished as usual. The result obtained is a leather dyed in a level clear blue hue with good fastnesses.

APPLICATION EXAMPLE I 0.2 part of the dye of Example 1 is dissolved in 100 parts of hot water and the solution is cooled down to room temperature. This solution is added to 100 parts of chemically bleached sulfite cellulose milled in 2000 parts of water in a hollander. After 15 minutes of thorough mixing, sizing is effected in a conventional manner with resin size and aluminum sulfate. Paper prepared from this stuff has a light blue hue with good wetfastnesses.

APPLICATION EXAMPLE J 3 parts of the dye of Example 3 are dissolved in 82 parts of demineralized water and 15 parts of diethylene glycol at 60° C. Cooling down to room temperature gives a blue printing ink which is very highly suitable for inkjet printing on paper or polyamide and wool textiles.

What is claimed is:

1. Compounds of formula (I)

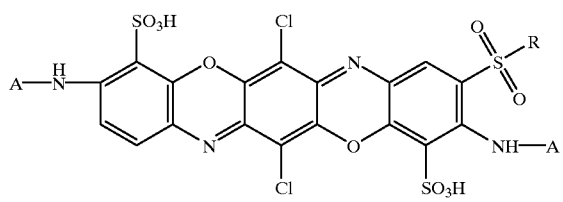

(I)

wherein A is hydrogen or a monosubstituted discretionary substituent and R is a discretionary radical on the sulfone group.

2. Compounds of the formula (I) according to claim 1, wherein A is hydrogen or a discretionarily substituted alkyl or aryl radical.

3. Compounds of formula (I) according to claim 1, wherein R is a discretionarily substituted alkyl, cycloalkyl or aryl radical.

4. Compounds of formula (I)

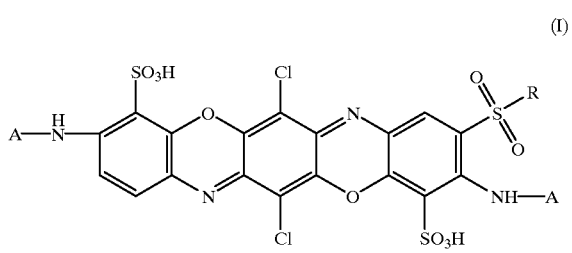

(I)

wherein A is hydrogen or a substituted alkyl or aryl radical and R is a substituted alkyl, cycloalkyl or aryl radical.

5. Compounds of formula (I)

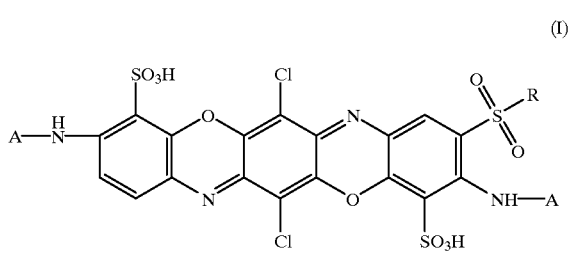

(I)

wherein A is hydrogen or a substituted alkyl or aryl radical and R is selected from the group of:

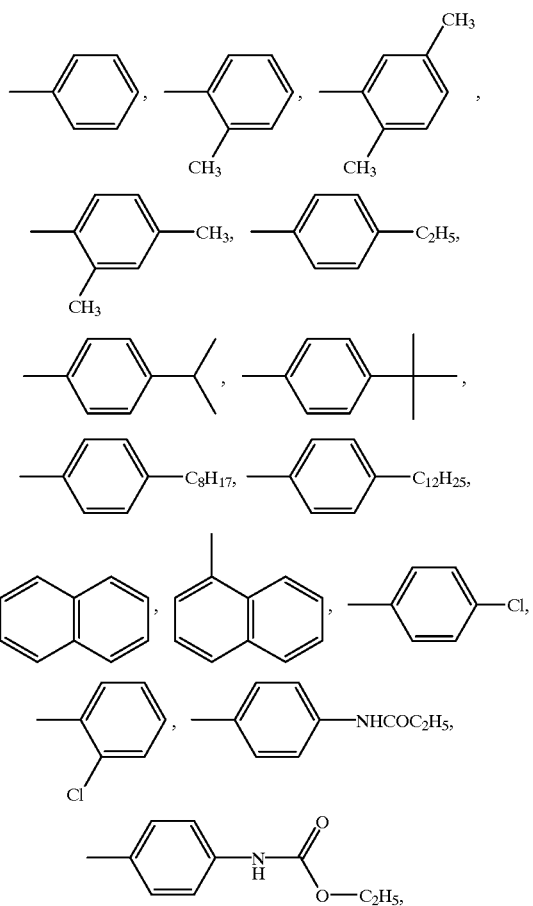

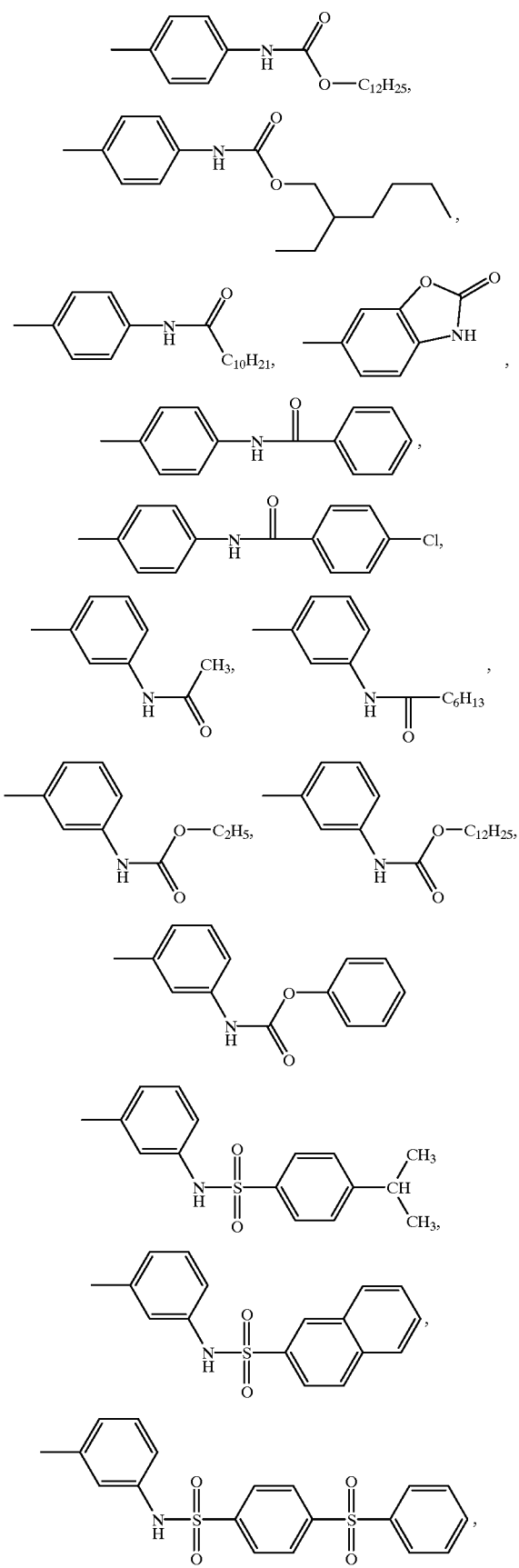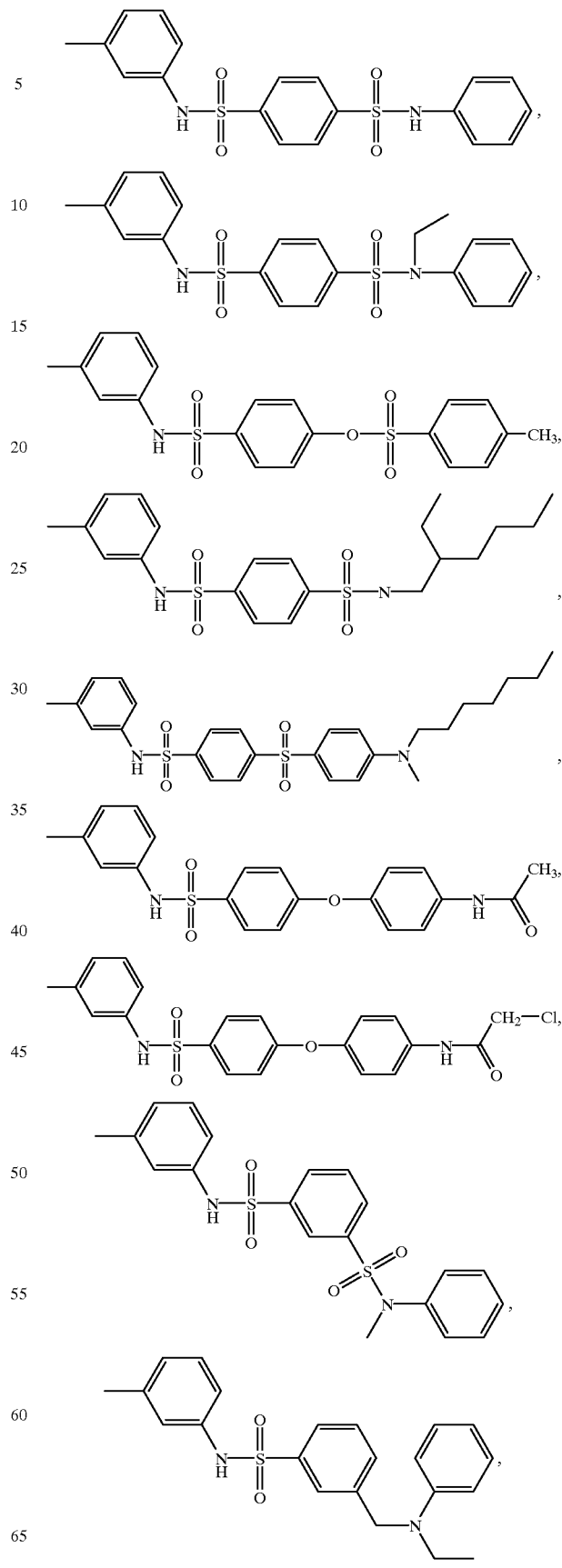

-continued
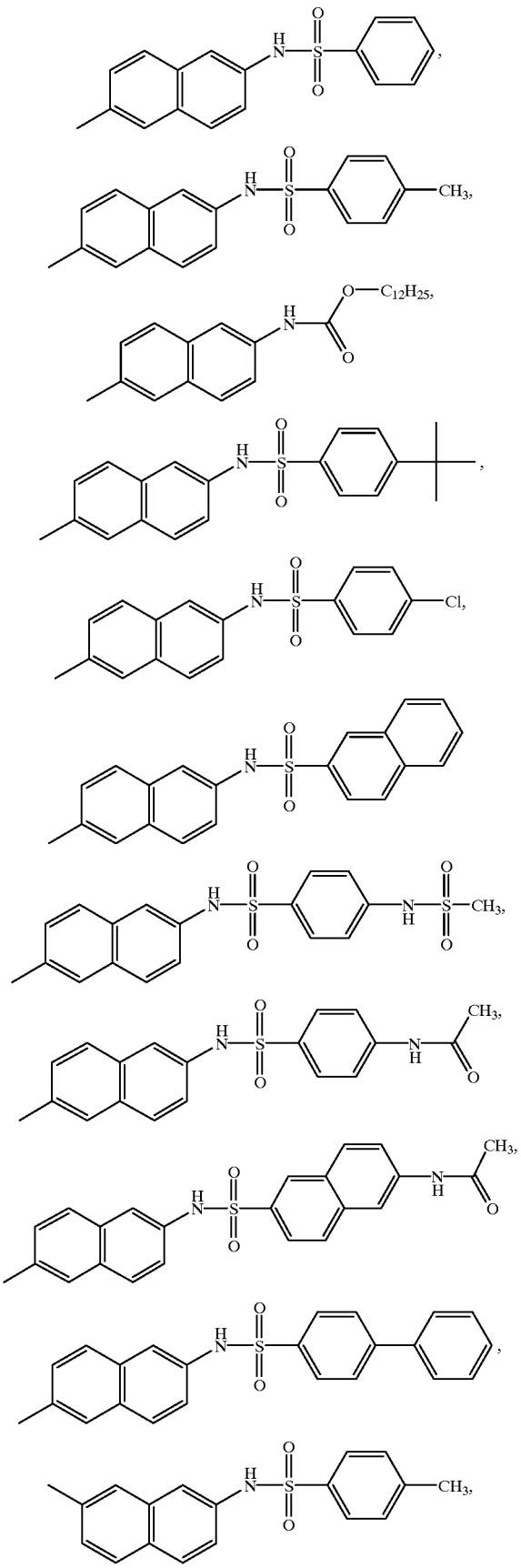
-continued
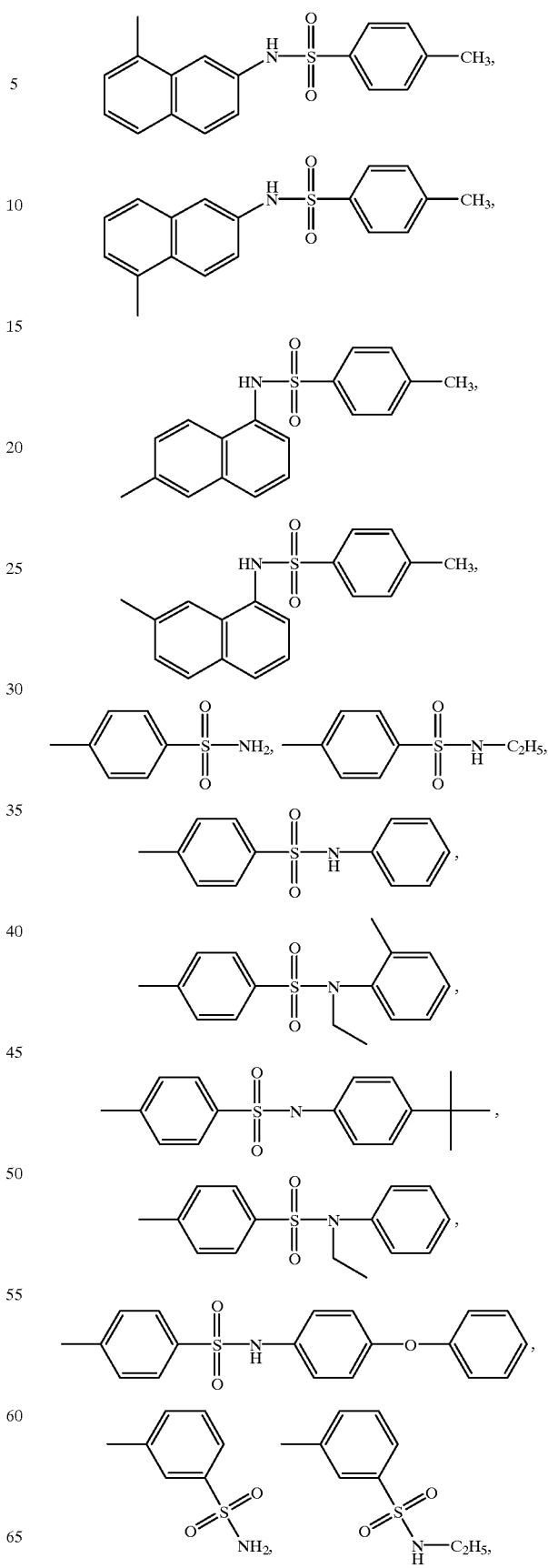

-continued

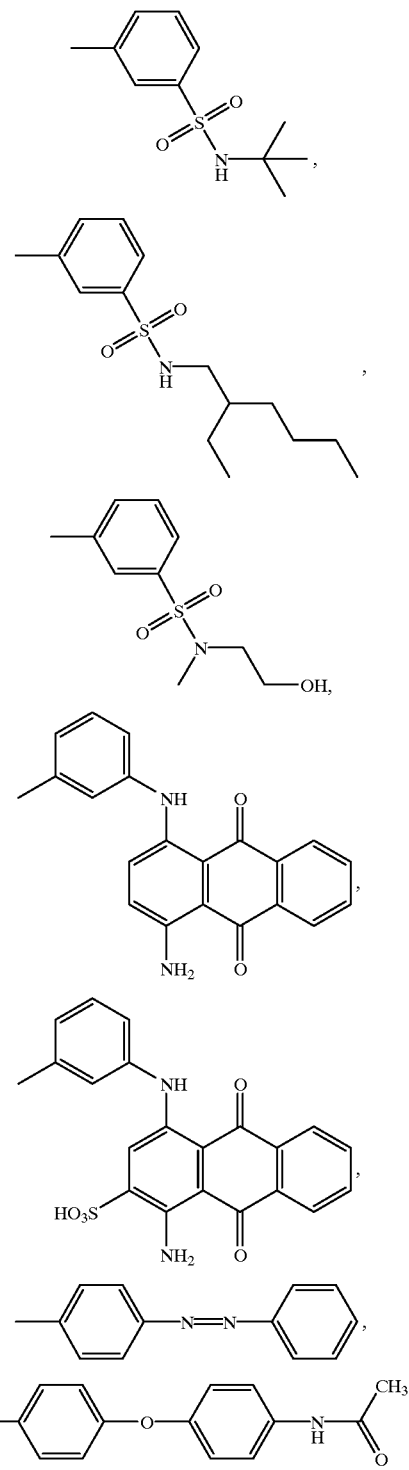

-continued

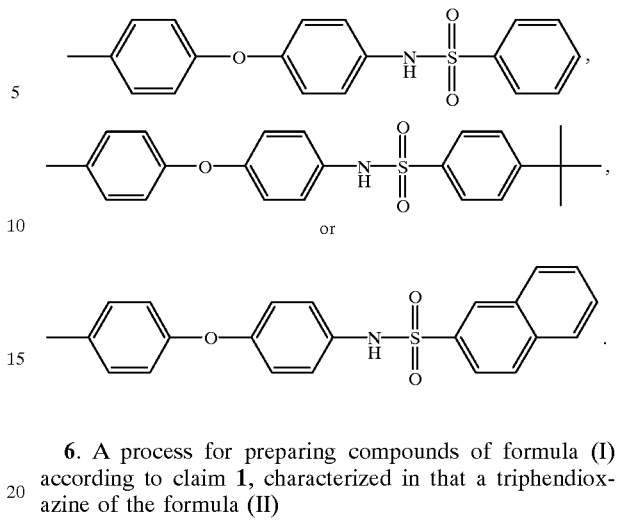

6. A process for preparing compounds of formula (I) according to claim 1, characterized in that a triphendioxazine of the formula (II)

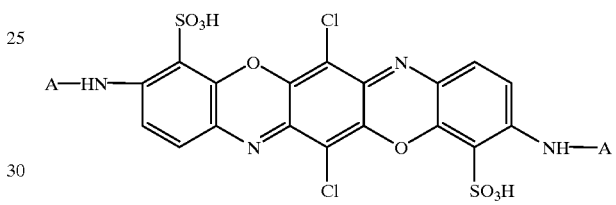

is reacted with a discretionarily substituted sulfinic acid or its salts in the presence of an oxidizing agent.

7. A process according to claim 6, characterized in that peroxodisulfates or iron(III) salts are used as oxidizing agent.

8. A process for the dyeing of an organic substrate comprising the step of:

contacting one or more compounds of the formula (I) according to claim 1 to an organic substrate.

9. A process for dying of wool, silk or polyamide comprising adding to a dyebath, at least on of the compounds of formula (1) according to claim 1 wherein (1) has no reactive groups or basic substituents, and dyeing wool, silk, or polyamide.

10. A process for dyeing of cellulose comprising adding to a dyebath a compound of formula (1) according to claim 1 which contains a reactive group for the dyeing of cellulose, and dyeing cellulose.

11. A process for preparing a printing ink suitable for inkjet printing comprising incorporating a compound of formula (1) according to claim 1 into a water-based printing ink formulation.

* * * * *